United States Patent [19]

Kagimoto et al.

[11] Patent Number: 5,248,325
[45] Date of Patent: Sep. 28, 1993

[54] GAS SEPARATING SYSTEM AND GAS RECOVERY SYSTEM

[75] Inventors: Yoshimi Kagimoto; Kunio Saki; Sadamu Takahashi; Jun Izumi; Kazuaki Ohshima, all of Nagasaki, Japan

[73] Assignee: Mitsubishi Jukogyo Kabushiki Kaisha, Tokyo, Japan

[21] Appl. No.: 880,130

[22] Filed: May 7, 1992

[30] Foreign Application Priority Data

| May 9, 1991 | [JP] | Japan | 3-104304 |
| Jul. 16, 1991 | [JP] | Japan | 3-175257 |
| Jul. 19, 1991 | [JP] | Japan | 3-179553 |
| Aug. 5, 1991 | [JP] | Japan | 3-195378 |

[51] Int. Cl.[5] .................................... B01D 53/04
[52] U.S. Cl. ........................................ 96/124; 96/130
[58] Field of Search ................... 55/179-181, 55/387, 389, 189

[56] References Cited

U.S. PATENT DOCUMENTS

| 2,706,532 | 4/1955 | Ringo et al. | 55/180 |
| 2,751,034 | 6/1956 | Ringo et al. | 55/180 |
| 3,201,921 | 8/1965 | Heyes | 55/179 X |
| 3,487,608 | 1/1970 | Gräff | 55/179 X |
| 3,757,492 | 9/1973 | Gräff | 55/181 |
| 4,038,054 | 7/1977 | Gräff | 55/179 |
| 4,469,494 | 9/1984 | van Weenen | 55/179 |
| 4,552,726 | 6/1985 | Berry et al. | 55/181 X |
| 4,764,276 | 8/1988 | Berry et al. | 55/181 X |
| 4,787,417 | 11/1988 | Windsor, Jr. | 55/179 X |
| 4,925,464 | 5/1990 | Rabenau et al. | 55/179 |
| 4,971,611 | 11/1990 | Noguchi | 55/181 |
| 5,080,700 | 1/1992 | Bergloff et al. | 55/181 |
| 5,112,367 | 5/1992 | Hill | 55/179 X |
| 5,133,784 | 7/1992 | Boudet et al. | 55/179 X |

FOREIGN PATENT DOCUMENTS

| 0107179 | 10/1983 | European Pat. Off. |
| 0115335 | 1/1984 | European Pat. Off. |
| 2111485 | 5/1972 | France |

Primary Examiner—Robert Spitzer
Attorney, Agent, or Firm—Jacobson, Price, Holman & Stern

[57] ABSTRACT

A rotary gas recovery system includes a fixed adsorption tower (12) divided into a plurality of sections (12') arranged in the circumferential direction around a central axis and filled with adsorbent (11), a first manifold (14) on one side of the tower having opening (14a, 14b) for supplying and discharging gases to and from the fixed adsorption tower, a second manifold (15) having openings (15a-15d) for supplying and discharging gases through the first manifold, and a movable valve plate (16) slidably interposed between the first manifold (14) and second manifold (15) and having openings (16a, 16b) for sequentially connecting the openings in the first manifold with the openings in the second manifold by a continuous motion.

8 Claims, 17 Drawing Sheets

GAS SEPARATING SYSTEM AND GAS RECOVERY SYSTEM

BACKGROUND OF THE INVENTION

This invention relates to a gas separating system and a gas recovery system. More particularly, it relates to a pressure swing type gas separating system (hereinafter sometimes called a PSA system) used for refining and recovering gases.

A conventional PSA system is shown in FIG. 21. An absorber 302 is filled with adsorbent 301. From one end of the absorber 302, a pipe 307 is connected to an untreated gas introduction valve 303 and an evacuation valve 305, whereas from the other end of the absorber 302, a pipe 308 is connected to a treated gas discharge valve 304 and a refining gas introduction valve 306.

In the adsorption process of this conventional PSA system, the evacuation valve 305 and the refining gas introduction valve 306 are closed and the untreated gas introduction valve 303 and treated gas discharge valve 304 are opened, whereby untreated gas is allowed to flow in the absorber 302. In the absorber 302, a particular component in the gas (for example, $CO_2$, $NH_3$, $O_2$, etc.) is adsorbed onto the adsorbent 301; as a result, treated gas which has passed through the absorber 302 without being adsorbed onto the adsorbent 301 can be obtained.

Next, in the desorption process, the valve operation reverse to the adsorption process is performed. Then, the absorber 302 is depressurized by a not illustrated vacuum pump, and a small amount of refining gas is allowed to flow into the absorber 302. Thus, the particular component adsorbed onto the adsorbent 301 is desorbed and discharged through the evacuation valve 305.

By repeating the above cycle, a particular gas component in the untreated gas is recovered, or a particular gas component is refined.

The above-described conventional PSA system has some disadvantages as described below because the adsorption and desorption processes are repeated and these processes are performed by an intermittent operation carried out by means of many valves. The disadvantages are as follows:

(1) Large amounts of adsorbent are required because the time of one cycle is as long as several minutes.
(2) A gas supplying means for untreated gas and an evacuating means (vacuum pump) are continuous rotating turbo machines, which do not match the intermittent operation, offering low efficiency. Specifically, the evacuating means operates wastefully in the adsorption process, whereas the gas supplying means does in the desorption process.
(3) To increase the capacity of the PSA system, increased amounts of adsorbent and many large-sized valves as well as the opening/closing control are required, resulting in higher cost.
(4) The impact noise accompanying the opening/closing of valves and the noise caused by sudden change of gas pressure in the circuit are high.

Also, a rotary gas recovery system shown in FIGS. 22 through 25 has so far been used.

In FIG. 22, 401 denotes an upper fixed seal plate, 402 denotes a lower fixed seal plate, 403 and 404 denote bearings installed to the seal plates, 405 denotes a rotating shaft which is mounted by the bearings for rotation, 406 denotes a key mounted on the rotating shaft, 407 denotes a rotary adsorbing/desorbing device which is fixedly secured to the rotating shaft 405 by the keys 406 and rotates between the upper fixed seal plate 401 and the lower fixed seal plate 402, 408 denotes a material gas supply port installed in the upper fixed seal plate 401, 409 denotes a particular gas discharge port installed in the upper fixed seal plate 401, 410 denotes a product gas discharge port installed in the lower fixed seal plate 402, 411 denotes a small hole for supplying purge gas which is installed in the lower fixed seal plate, 412 denotes a plurality of compartments extending axially through the rotary adsorbing/desorbing device, 413 denotes an adsorbent put into each compartment, 414 denotes a gas compressor for feeding the material gas under pressure through the material gas supply port 408, 415 denotes a vacuum pump which is connected to the particular gas discharge port and depressurizes and sucks the particular gas for discharge and recovery, 416 denotes a seal surface between the upper fixed seal plate 401 and the rotary adsorbing/desorbing device 407, and 417 denotes a seal surface between the lower fixed seal plate 402 and the rotary adsorbing/desorbing device 407.

In the above-described system, the material gas is supplied by the gas compressor 414 to the compartments 412 of the rotary adsorbing/desorbing device through the material gas supply port 408. In the compartments 412, a particular gas is adsorbed onto the adsorbent 413 in the compartment 412, and the gas which has not been adsorbed, that is to say, the product gas is discharged through the product gas discharge port. By the rotation of the adsorbing/desorbing device 407, when the compartment which is filled with the adsorbent onto which a particular gas has been adsorbed comes into communication with the particular gas discharge port 409, the particular gas is removed from the adsorbent 413 by the evacuating action of the vacuum pump 415 and discharged for recovery. In this process, purge gas is fed through the small hole for supplying purge gas in the lower fixed seal plate 402. Thus, the product gas is produced and the particular gas is recovered continuously by the rotation of the adsorbing/desorbing device 407.

In the above-described system, the adsorbing/desorbing device 407 rotates and the upper and lower seal plates 401, 402 are fixed. Therefore, the mating surfaces cannot be connected completely, and seal surfaces with a gap are provided, so that the material gas leaks from the seal surface 416. In recovering the particular gas, external gas also flows into the particular gas discharge port 409 through the seal surface 416. The leaked gas poses no problem of deteriorated system performance if it accounts for 1% or less of the supplied gas. However, when the system capacity is increased, the manufacturing accuracy of seal plates 401, 402 decreases, and hence the gaps of seal surfaces 416, 417 increase. As a result, the increase in leaked gas deteriorates the system performance. Since the amount of leaked gas is proportional to the third power of the gap, the effect of gap is very large. In addition, the wear of seal surface increases the gap, so that the system performance deteriorates with time. To overcome this problem, it is necessary to carry out maintenance frequently, which increases the running cost of the system.

BRIEF SUMMARY OF THE INVENTION

An object of this invention is to provide a gas separating system and a gas recovery system (including a PSA system) which eliminate the above disadvantages.

The first aspect of this invention for eliminating the above disadvantages is a rotary gas recovery system which comprises a fixed adsorption tower which is divided into a plurality of sections arranged in the circumferential direction around the center axis and filled with adsorbent, a first manifold for supplying and discharging gases on the side of the fixed adsorption tower, a second manifold for supplying and discharging gases on the side of pipe, and a rotatable valve plate which is interposed between the first manifold and the second manifold and sequentially connects the first manifold to the second manifold by a constant motion.

The second aspect of this invention for eliminating the above disadvantages is a pressure swing type gas separating system which comprises a plurality of adsorbing portions filled with adsorbent, a first manifold connected to the adsorbing portions, a second manifold connected to an untreated gas pipe, a treated gas pipe, a refining gas pipe, and a vacuum source, and a valve plate which is interposed between the first manifold and the second manifold and selectively connects the inlet and outlet of the adsorbing portion to the untreated gas pipe and treated gas pipe or the vacuum source and refining gas pipe through the first and second manifolds.

The third aspect of this invention for eliminating the above disadvantages is a PSA gas separating system having adsorbing portions connected to a gas supply source and a vacuum source via a selector valve, in which the selector valve comprises a first manifold having openings connected to the adsorbing portion, a second manifold having openings connected to a gas supply source and openings connected to a vacuum source, and a valve plate which is interposed between the first manifold and the second manifold and has openings connected to the openings in the first manifold, wherein the valve plate is disposed within a space between the first and second manifolds and oscillated so that the openings therein are rotated in the same direction with an equal radius of rotation around parallel axes perpendicular to the valve plate so that these openings are sequentially connected to the opening communicating with the gas supply source and the opening communicating with the vacuum source in the second manifold.

The fourth aspect of this invention for eliminating the above disadvantages is a gas recovery system which comprises a fixed adsorbing/desorbing device having a plurality of compartments in the circumferential direction around the center axis which are filled with adsorbent, a first rotary valve plate which has a material gas opening and a particular gas opening, whose one surface is in contact with one end surface of the adsorbing/desorbing device and which is movable in the axial direction and rotatable around a rotating shaft, a first seal plate which has a circumferential material gas groove and a circumferential particular gas groove, whose surface is in contact with the other surface of the rotary valve plate and which is movable in the axial direction but not rotatable around the rotating shaft, a second rotary valve plate which has a product gas opening and a purge gas groove, whose surface is in contact with the other end surface of the adsorbing/desorbing device and which is movable in the axial direction and rotatable around the rotating shaft at the same speed as that of the first rotary valve plate, a second seal plate which has a circumferential product gas groove and a circumferential purge gas groove, whose surface is in contact with the other surface of the second rotary valve plate and which is movable in the axial direction but not rotatable around the rotating shaft, and a load applying mechanism for pressing the seal plates and the rotary valve plates against each end surface of the adsorbing/desorbing device.

According to the first aspect of this invention described above, the use of rotatable valve plate reduces the consumption of adsorbent, improves the efficiency of gas separating system, thereby the cost being reduced, and decreases the noise. Thus, the disadvantages of the conventional gas recovery system can be eliminated.

According to the second aspect of this invention described above, the adsorption and desorption processes are performed sequentially and continuously in a plurality of adsorbing portions by the rotation of valve plate. Therefore, the following effects can be achieved:

(1) The cycle time can be shortened, and the amount of adsorbent with which the adsorbing portions are filled can be decreased.
(2) The power loss is low and the gas separation efficiency can be increased because the gas supplying means and the evacuating means have no wasteful waiting time.
(3) A system of high capacity and low cost can be easily provided because a rotating valve plate is used in place of the conventional on-off valve.
(4) The change in gas pressure in the system is smaller than that in the conventional system, resulting in lower noise.

According to the third aspect of this invention described above, the adsorption and desorption processes are performed sequentially and continuously in the adsorbing portions by oscillating of the valve plate of selector valve. Therefore, the following effects can be achieved:

(1) Since the valve plate performs oscillation motion and the openings therein have a small radius of rotation, the sliding speed of valve plate in relation to the first and second manifolds can be decreased, thereby the required driving power being reduced.
(2) The openings in the first and second manifolds and the valve plate are not necessarily arranged radially, which provides larger degree of freedom in arrangement, thereby the system being made compact.
(3) The cycle time can be shortened, and the amount of adsorbent with which the adsorbing portions are filled can be decreased.
(4) The power loss is low and the gas separation efficiency can be increased because the gas supplying means and the evacuating means have no wasteful waiting time.
(5) A system of high capacity and low cost can be easily provided because oscillating valve plate is used in place of the conventional on-off valve.
(6) There is no need for using large seal members because the seal can be installed independently for each adsorbing portion or for each opening of the first manifold on the side of adsorbing portion.

According to the fourth aspect of this invention described above, the system comprises a fixed adsorbing/desorbing device having a plurality of compartments in the circumferential direction around the center axis which are filled with adsorbent, a first rotary valve plate which has a material gas opening and a particular gas opening and is rotatable, a first seal plate which has a circumferential material gas groove and a circumferential particular gas groove and is not rotatable, a second rotary valve plate which has a product gas opening and a purge gas groove and rotatable at the same speed as that of the first rotary valve plate, a second seal plate which has a circumferential product gas groove and a circumferential purge gas groove and is not rotatable, and a load applying mechanism for pressing the seal plates and the rotary valve plates against each end surface of the adsorbing/desorbing device. Therefore, the driving system can be made compact, by which the manufacturing cost can be reduced, and power consumption can be lessened, resulting in decreased running cost.

BRIEF DESCRIPTION OF THE DRAWINGS

The present invention will now be described in detail with reference to the embodiments shown in the accompanying drawings wherein.

DETAILED DESCRIPTION OF A PREFERRED EMBODIMENT

An embodiment of this invention according to the first and second (especially the second) aspects will be described with reference to FIGS. 1 through 5.

Figure 2:
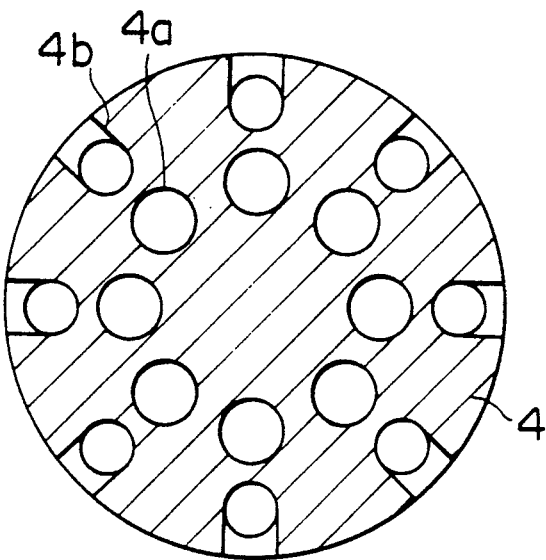
FIG. 2 is a cross sectional view taken along the plane of line A—A of FIG. 1.
Figure 5:
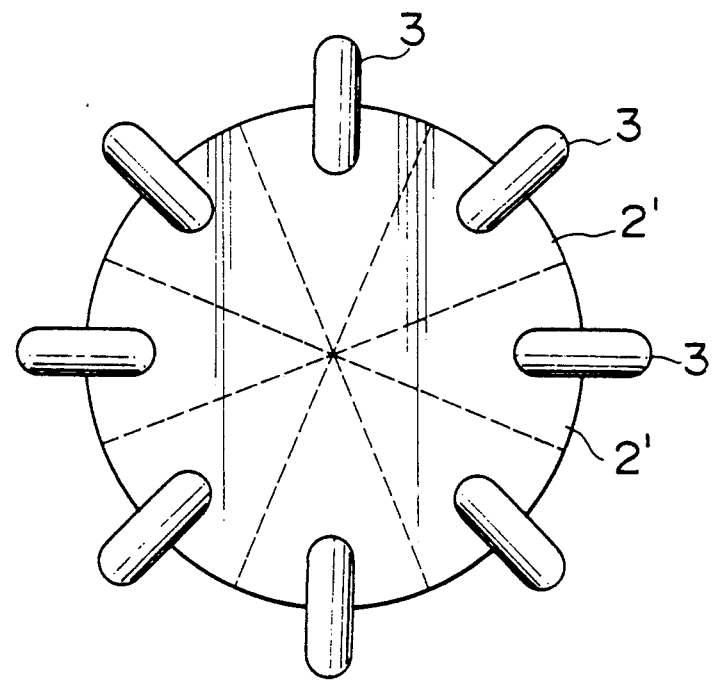
FIG. 5 is a plan view in the direction of arrow D of FIG. 1.

A vertical type cylindrical adsorption tower 2 filled with adsorbent 1 is partitioned into eight fan-shaped chambers 2' as shown by broken lines in FIG. 5. From the outlet side of each chamber 2', a pipe 3 is connected to a circular first manifold 4 independently. The manifold 4, though it may be installed separately from the adsorption tower 2, is positioned fixedly under the adsorption tower 2 in this embodiment, the inlet side of each chamber 2' of the adsorption tower 2 being integral with the opening 4a on the inlet side of the first manifold 4. The opening 4a is circular in shape, and there are eight openings corresponding to the chambers 2' of the adsorption tower 2. On the peripheral side of the first manifold 4, eight outlet side openings 4b are installed which are directed inward in the radial direction, each of which is connected to the pipe 3. The openings 4a and 4b are positioned on the same radius of the first manifold 4 as shown in FIG. 2.

Figure 4:
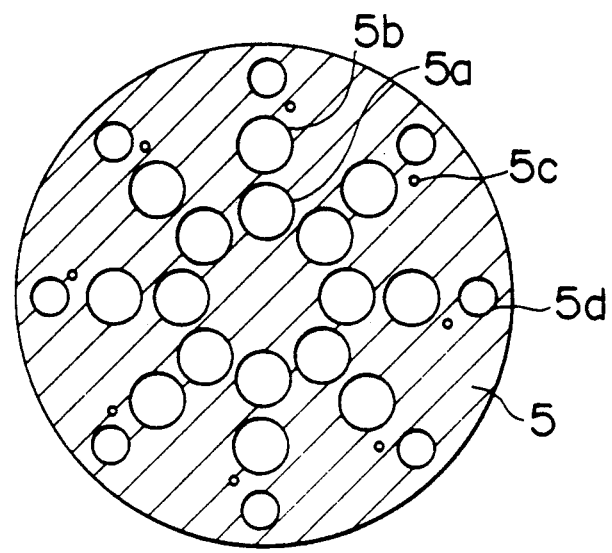
FIG. 4 is a cross sectional view taken along the plane of line C—C of FIG. 1.

Under the first manifold 4, a second fixed manifold 5 is disposed with a space between them. As shown in FIG. 4, in this manifold 5, openings 5a connected to a vacuum source, openings 5b connected to an untreated gas pipe, and openings 5d connected to a treated gas pipe are arranged on the same radius from the inside to the outside in that order. The openings 5a, 5b, 5d are circular in shape, and a total of eight sets of openings 5a, 5b, 5c are disposed at equal intervals. Also, a total of eight small circular openings 5c connected to a refining gas pipe are installed slightly aside between the openings 5b and 5d.

Figure 3:
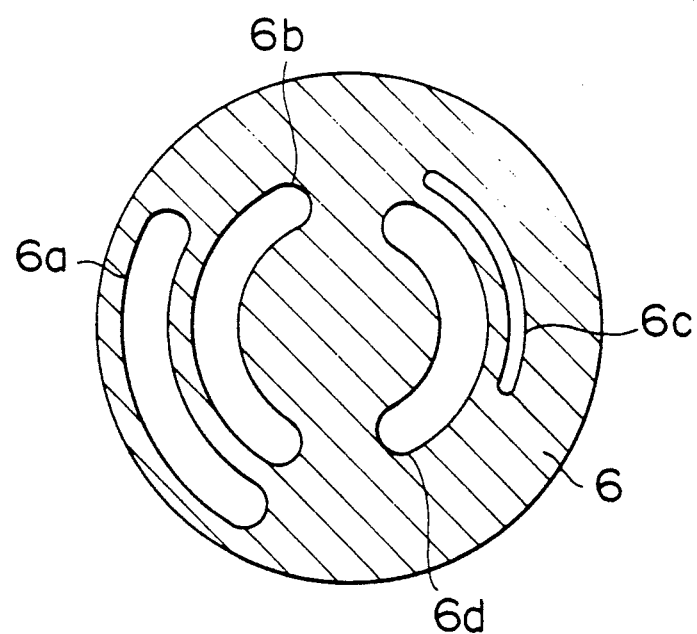
FIG. 3 is a cross sectional view taken along the plane of line B—B of FIG. 1.

Between the first and second manifolds, a valve plate 6 is interposed which can rotate around a center shaft 6'. As shown in FIG. 3, in the valve plate 6, inner and outer openings 6b, 6a of circular arc shape are disposed at the left half part of FIG. 3, and inner and outer openings 6d, 6c of circular arc shape at the right half. The openings 6b extends slightly in the rotating direction of the valve plate 6 beyond the opening 6a, and the opening 6d extends slightly in the rotating direction of the valve plate 6 beyond the opening 6c. The opening 6a is open to two adjacent openings 5d, the opening 6b is open to three adjacent openings 5b, the opening 6c is open to two openings 5c, and the opening 6d is open to three adjacent openings 5a. Also, the openings 6a, 6c are open to two adjacent outlet side openings 4b, and the openings 6b, 6d are open to three adjacent inlet side openings 4a.

Figure 1:
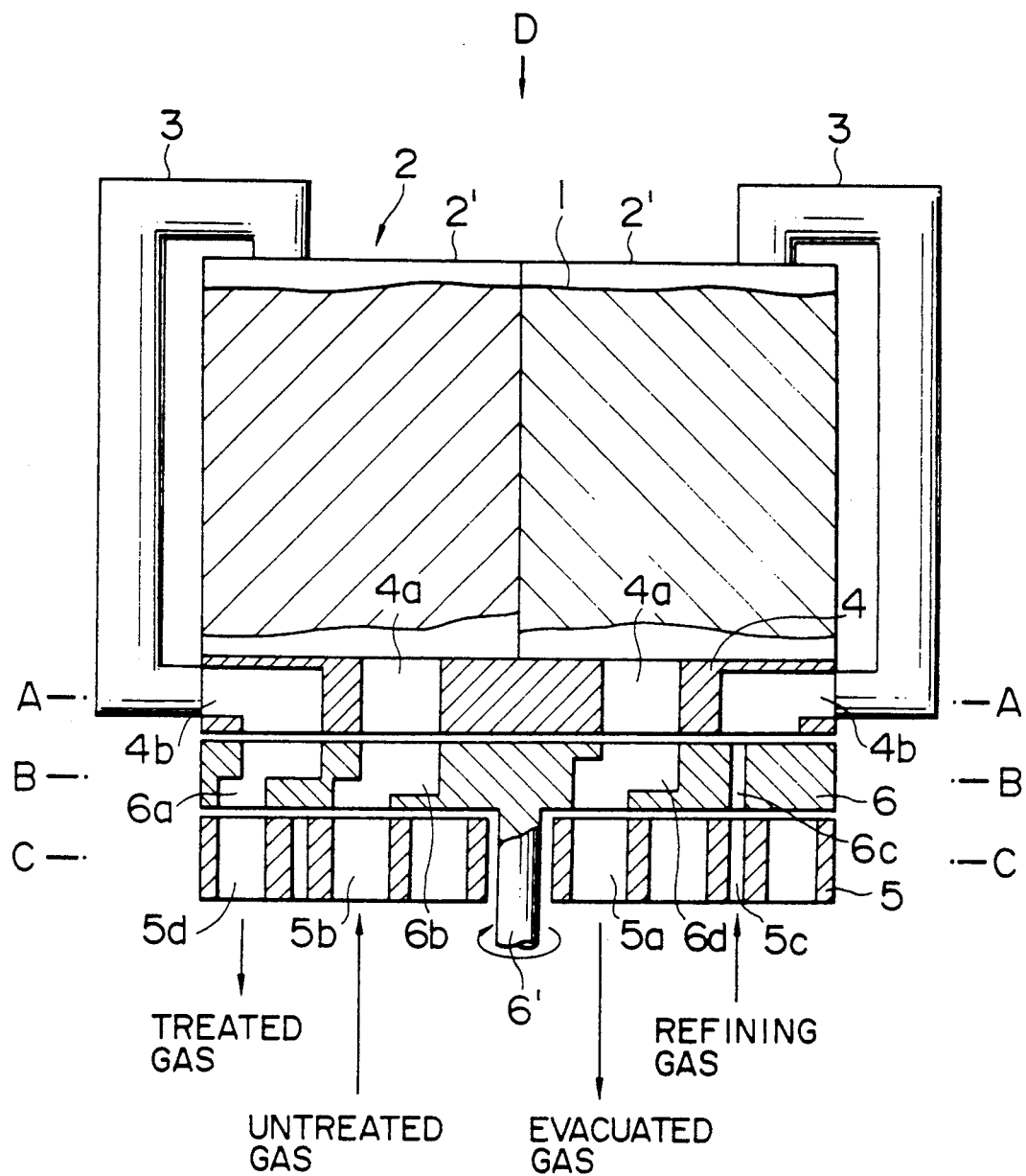
FIG. 1 is a vertical cross sectional view illustrating an embodiment of this invention according to the first and second (especially the second) aspect.

In this embodiment thus constituted, in the chamber 2' of the adsorption tower 2 shown at the left hand in FIG. 1, the inlet side opening 4a of the first manifold 4 is connected to the opening 5b of the second manifold 5, which is connected to the untreated gas pipe, via the opening 6b of the valve plate 6, and the outlet side opening 4b of the first manifold 4 is connected to the treated gas pipe of the second manifold 5, which is connected to the treated gas pipe, via the opening 6a of the valve plate 6. In the chamber 2' of the adsorption tower 2 shown at the right hand in FIG. 1, the inlet side opening 4a of the first manifold 4 is connected to the opening 5a of the second manifold 5, which is connected to the vacuum source, via the opening 6d of the valve plate 6, and the outlet side opening 4b of the first manifold 4 is connected to the opening 5c of the second manifold 5, which is connected to the refining gas pipe, via the opening 6c of the valve plate 6.

Therefore, in the chamber 2' of the adsorption tower 2 shown at the left hand of FIG. 1, the adsorption process is carried out: untreated gas is supplied to the chamber 2' through the openings 5b, 6b, 4a as shown by an arrow, a particular component in the untreated gas is adsorbed onto the adsorbent 1 in the chamber 2', and the treated gas is discharged through the pipe 3 and the openings 4b, 6a, and 5d. In the chamber 2' of the adsorption tower 2 shown at the right hand of FIG. 1, the desorption process is carried out: the chamber 2' is evacuated by being connected to the vacuum source through the openings 4a, 6d, 5a, and a small amount of refining gas is supplied to the chamber 2' through the openings 5c, 6c, 4b and the pipe 3 to remove the adsorbed gas from the adsorbent.

The valve plate 6 is rotated by a not illustrated motor or the like, by which the adsorption and desorption processes are repeated sequentially in each chamber 2' of the adsorption tower 2. Since the openings in the first and second manifolds 4, 5 and the valve plate 6 are constituted as described above, the adsorption process is carried out in two chambers 2' on one side of the four chambers 2' opposing each other, and the desorption process is carried out in two chambers 2' on the other side.

In this embodiment, adsorption and desorption are performed repeatedly in the chamber 2' of the adsorption tower 2 by the rotation of the valve plate 6 as described above. Adsorption and desorption are performed sequentially and continuously in any chambers 2'. By the simple constitution without valve, adsorption and desorption can be performed with turbo machines of a gas supplying means and an evacuating means each being operated continuously for performing effective work, and the change in gas pressure in the system can be reduced, resulting in lower noise.

In this embodiment, the lower part of the adsorption tower is integral with the manifold 4, so that a simple construction without pipes on the inlet side of the adsorption tower is provided.

Although the refining gas is distinguished from the treated gas in this embodiment, part of the treated gas can be used as refining gas by supplying it to the chamber 2' of the adsorption tower 2 through the refining gas pipe.

In the above embodiment of this invention, from the viewpoint of one adsorbing portion, at a certain time, its inlet side is connected to an untreated gas pipe and its outlet side is connected to a treated gas pipe, so that the untreated gas enters the adsorbing portion, where adsorption is performed. The treated gas, which has passed through the adsorption tower without being adsorbed in the adsorbing portion, is allowed to flow into the treated gas pipe from the outlet side. At the subsequent time, the inlet side of adsorbing portion is connected to a vacuum source and the outlet side is connected to a refining gas pipe, so that the adsorbing portion is evacuated and the refining gas flows from the refining gas pipe to the adsorbing portion to perform desorption.

From the viewpoint of the gas pipe and vacuum source, each gas pipe and vacuum source are always connected to at least one adsorbing portion, so that adsorption and desorption are performed sequentially and continuously in the adsorbing portions.

(2) The invention described above with reference to the embodiment shown in FIGS. 1 through 5 (especially the invention according to the second aspect) has the following disadvantages:

1. Four ports connected to gas sources and vacuum source must be arranged in the radial direction, there being no freedom of layout.

2. As a result of item 1, the diameter of valve plate 6 is increased, resulting in increased torque due to sliding and increased size of the driving unit. There is also greater power loss.

3. Since the sliding speed at the outer part increases, there are difficulties in designing the sliding surface, which inhibits the increase in the number of revolutions (shortened cycle time).

4. A large continuous seal is required over the half of the circumference of the manifold.

Therefore, the inventors have developed a PSA gas separating system which can eliminate the above disadvantages while maintaining the advantages of a rotary valve type PSA gas separating system, and which responds especially to the above second aspect and is new and not pubicly known.

A first embodiment of this invention according to the first and third (especially the third) aspects will be described with reference to FIGS. 6 through 9. Reference numeral 12 denotes a cylindrical adsorption tower having four vertically divided adsorbing portions 12' which are filled with adsorbent 11. Under the adsorption tower, a disc-shaped first manifold 14 is disposed. The first manifold 14 has circular openings 14a which open at the lower part of the adsorbing portions 12' and circular openings 14b on the outer radially sides of the openings 14a, the opening 14b being connected to a pipe 13 communicating with the upper part of the adsorbing portion 12'. Four sets of openings 14a, 14b corresponding to the adsorbing portions 12' are arranged in the radial direction of the adsorption tower 12.

Figure 8:
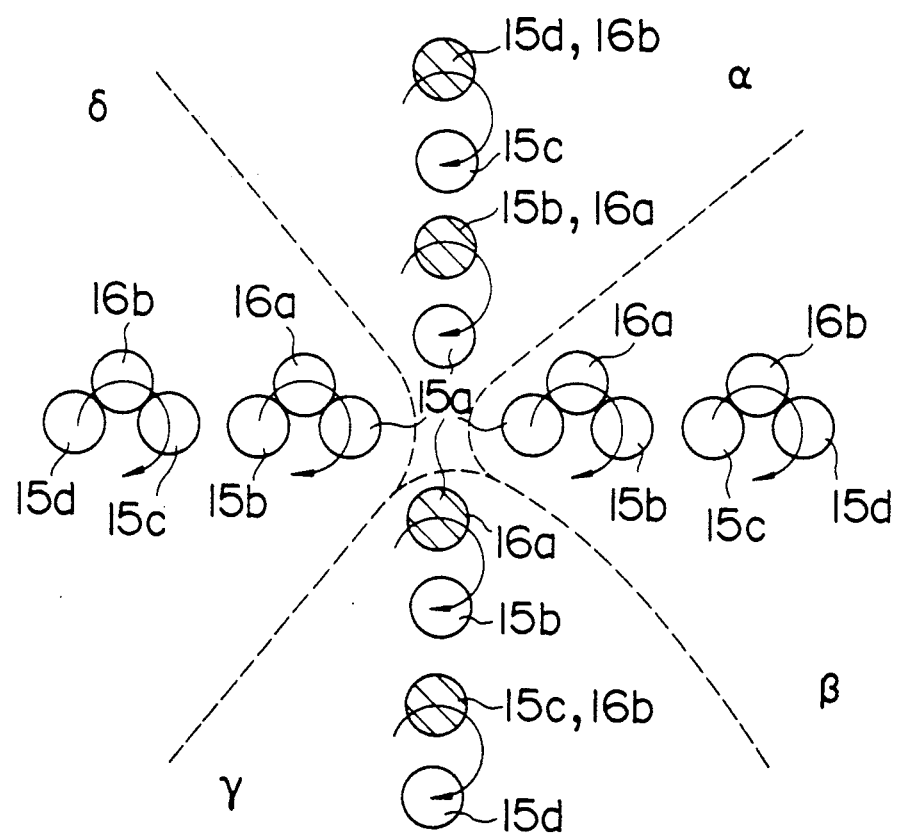
FIG. 8 is a schematic view of an arrangement of openings in the second manifold and valve plate of the embodiment in FIG. 6, FIGS. 9(A) to 9(I) are schematic view illustrating the relationship of openings in the second manifold and valve plate of the embodiment in FIG. 6.
Figure 9C:
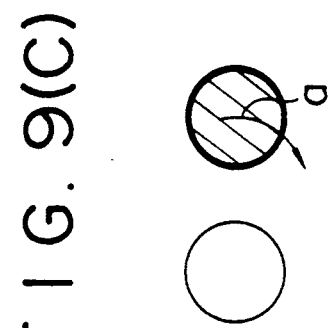
Figure 9F:
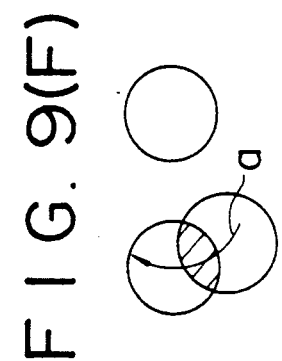
Figure 9I:
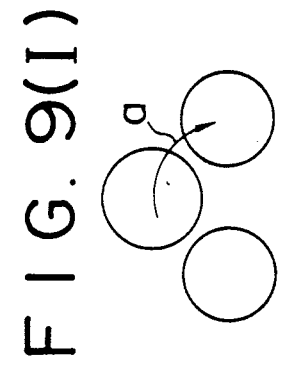
Figure 9B:
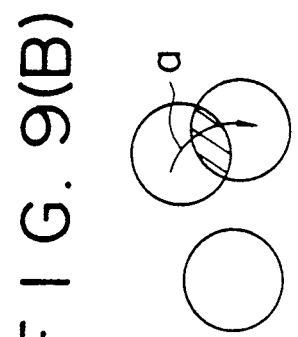
Figure 9E:
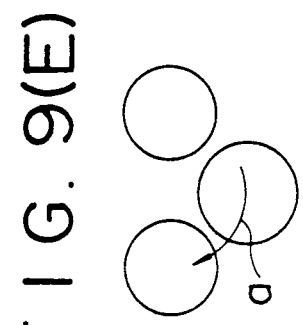
Figure 9H:
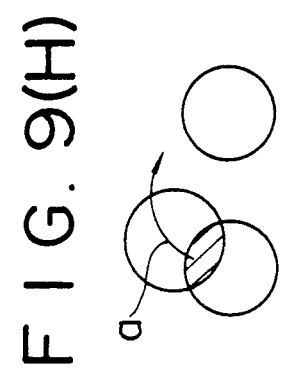
Figure 9A:
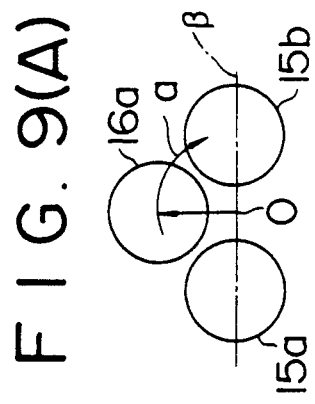
Figure 9D:
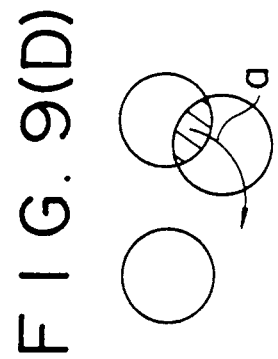
Figure 9G:
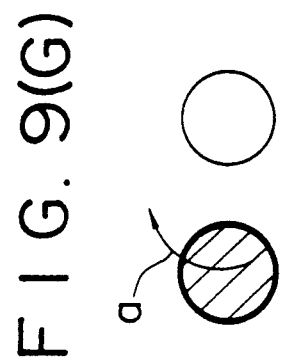

Reference numeral 15 denotes a disc-shaped second manifold disposed in parallel under the first manifold 14. The second manifold 15 has circular openings 15a, 15b, 15c, 15d arranged from the inside to the outside in that order in the radial direction of the adsorption tower 12 as shown in FIG. 8. These openings correspond to the openings 14a, 14b of the first manifold which correspond to the adsorbing portions 12'. The openings 15a, 15b are under the opening 14a of the first manifold, and the openings 15c, 15d are under the opening 14b of the first manifold.

Reference numeral 16 denotes a valve plate interposed slidably between the first and second manifolds 14, 15. The valve plate 16 is oscillated by eccentric discs 17a, 17b which rotate in the same direction with the same eccentricity r around shafts 17a, 17b, perpendicular to the valve plate 16 at both ends eccentric to the center of the adsorption tower 12. The valve plate also has circular openings 16a, 16b in the radial direction of the adsorption tower 12. The openings 16a, 16b move so as to be tangent internally to the openings 14a, 14b of the first manifold 14 during the oscillation of the valve plate and have the same diameter as that of the openings 15a–15d of the second manifold 15. As the valve plate 16 oscillates, the openings 16a and 16b are open sequentially to the corresponding openings 15a, 15b, and 15c, 15d of the second manifold 15 as shown in FIGS. 8 and 9.

The opening 15a of the second manifold 15 is connected to a vacuum source, the opening 15b to an untreated gas source, the opening 15c to a refining gas source, and the opening 15d to a treated gas source.

In FIG. 8, $\alpha, \beta, \gamma, \delta$ indicate the sections corresponding to the adsorbing portions 12'. In the adsorbing portions 12', the angle formed by the vector directed from the openings 16a, 16b of the valve plate 16 to the virtual center of motion and the vector directed from the opening 15a to 15b and from 15c to 15d differs by $\pi/2$ radian respectively. In this embodiment, where the adsorbing portion is divided into four, it is best to change the angle by $\pi/2$, but generally when the adsorbing portion is divided into n, it is the best to change the angle by $2\pi/n$.

FIGS. 9(A)–9(I) show the relationship between the opening 16a of the valve plate 16 and the openings 15a, 15b for a particular adsorbing portion 12'. FIG. 9 indicates the relationship for ⅛ cycle by (A) through (I). In the figure, the condition in which the opening 16a is superposed on the opening 15a or 15b is indicated by hatching, and the direction of movement of opening 16a is indicated by the arrow a. The relationship between the opening 16b of the valve plate 16 and the openings 15c, 15d of the second manifold 15 is similar to (A)–(I) in FIG. 9, though not shown in the drawings. As shown in FIG. 9, the opening 16a performs circular motions of radius r around the virtual center O as indicated by the arrow a as the valve plate 16 oscillates.

In the condition of (B)–(D) in FIG. 9 where the opening 16a communicates with the opening 15b (at this time, the opening 16b also communicates with the opening 15d), the adsorption process is performed: The untreated gas is introduced into the adsorbing portion 12' through the openings 15b, 16a, and 14a. In the adsorbing portion 12', a particular component in the untreated gas is adsorbed onto the adsorbent 11, and the treated gas is discharged through the pipe 13 and the openings 14b, 16b, and 15d. In the condition of FIGS. 9(F)–9(H) where the opening 16a communicates with the opening 15a (at this time, the opening 16b also communicates with the opening 15c), the desorption process is performed: the refining gas is introduced into the adsorbing portion 12' through the openings 15c, 16b, and 14b and the pipe 13, while the adsorbing portion 12' is connected to a vacuum source through the openings 14a, 16a, and 15a, so that the particular component adsorbed onto the adsorbent 11 is discharged from the adsorbing portion 12'. (A), (E) and (I) are neutral processes between the above-described adsorption and desorption processes. The above processes are performed repeatedly, one cycle for one oscillating motion of the valve plate 16.

In adsorbing portions 12', the above-described adsorption, desorption, and neutral processes are performed with the phase being shifted by ¼ as shown in FIG. 8, so that adsorption by the adsorbent 11 and desorption are performed simultaneously in some adsorbing portions 12'.

The motion of the valve plate 16 for performing the above processes is an oscillating motion by the rotation of eccentric discs 17a, 17b with an eccentricity r. The eccentricity r, which is the rotation radius of rotating motion of the openings in valve plate 16 may be sufficiently small; therefore, the sliding speed of the valve plate 16 can be reduced in this embodiment as compared with the PSA system with a rotary valve as shown in FIGS. 1 through 5, whereby the required driving power is reduced.

Since the valve plate 16 is oscillated in this embodiment, the system offers advantages of reduced cycle time, small amounts of adsorbent, and low noise, as with the PSA gas separating system shown in FIGS. 1 through 5.

Figure 10:
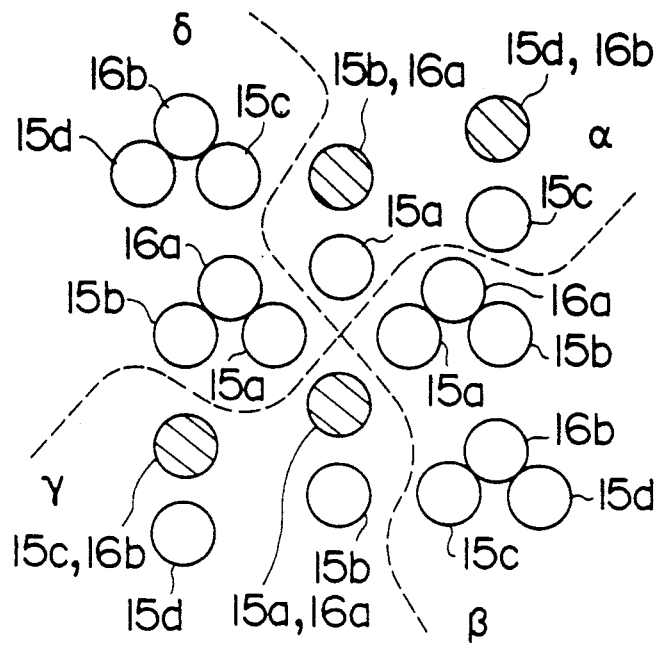
FIG. 10 is a schematic view of an arrangement of openings in the second manifold and valve plate of the second embodiment of this invention according to the first and third (especially the third) aspects.

A second embodiment of this invention according to the first and third (especially the third) aspects will be described with reference to FIG. 10. In this embodiment, the openings 15a through 15d of the second manifold 15 in the section $\alpha$–$\delta$ corresponding to the adsorbing portion in the first embodiment are arranged in a compact manner as shown in FIG. 10.

Figure 11:
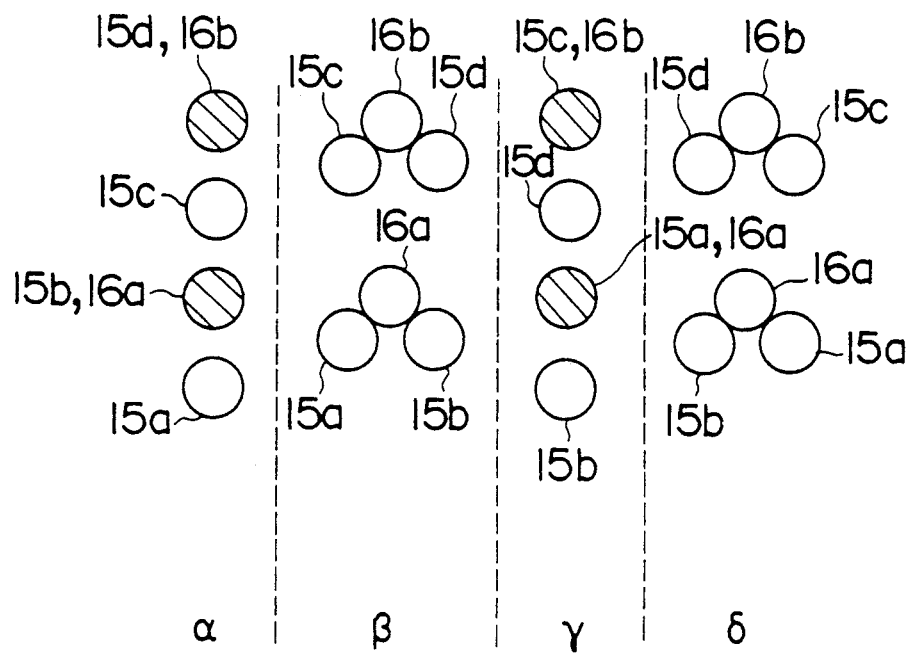
FIG. 11 is a schematic view of an arrangement of openings in the second manifold and valve plate of the third embodiment of this invention according to the first and third (especially the third) aspects.

A third embodiment of this invention according to the first and third (especially the third) aspects will be described with reference to FIG. 11. In this embodiment, the openings 15a through 15d of the second manifold 15 and the openings 16a, 16b of the valve plate 16 are arranged so that the arrangement is suited to the case where a plurality of adsorbing portions are arranged transversely. The openings 15a through 15d and the openings 16a, 16b corresponding to the adsorbing portion are arranged in a linear relation.

Figure 6:
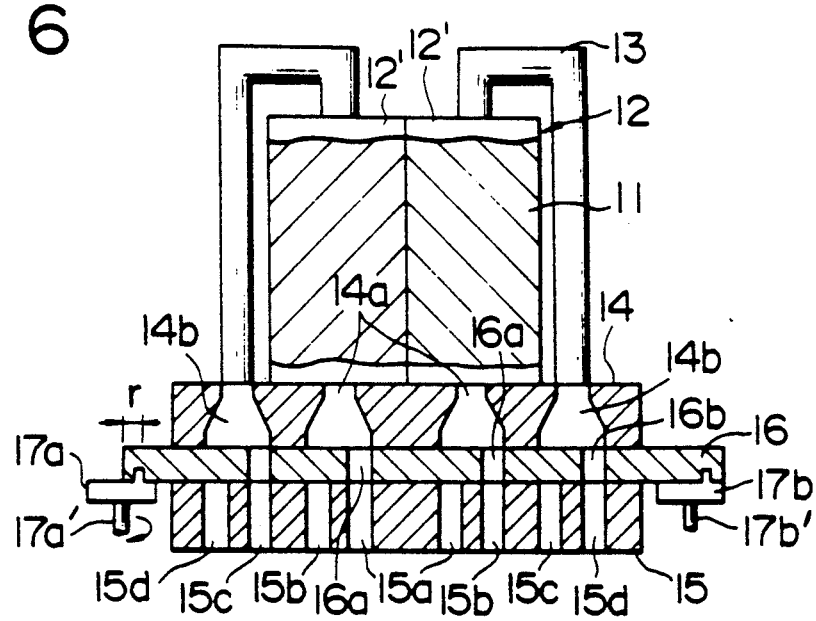
FIG. 6 is a vertical cross sectional view illustrating the first embodiment of this invention according to the first and third (especially the third) aspects.
Figure 7:
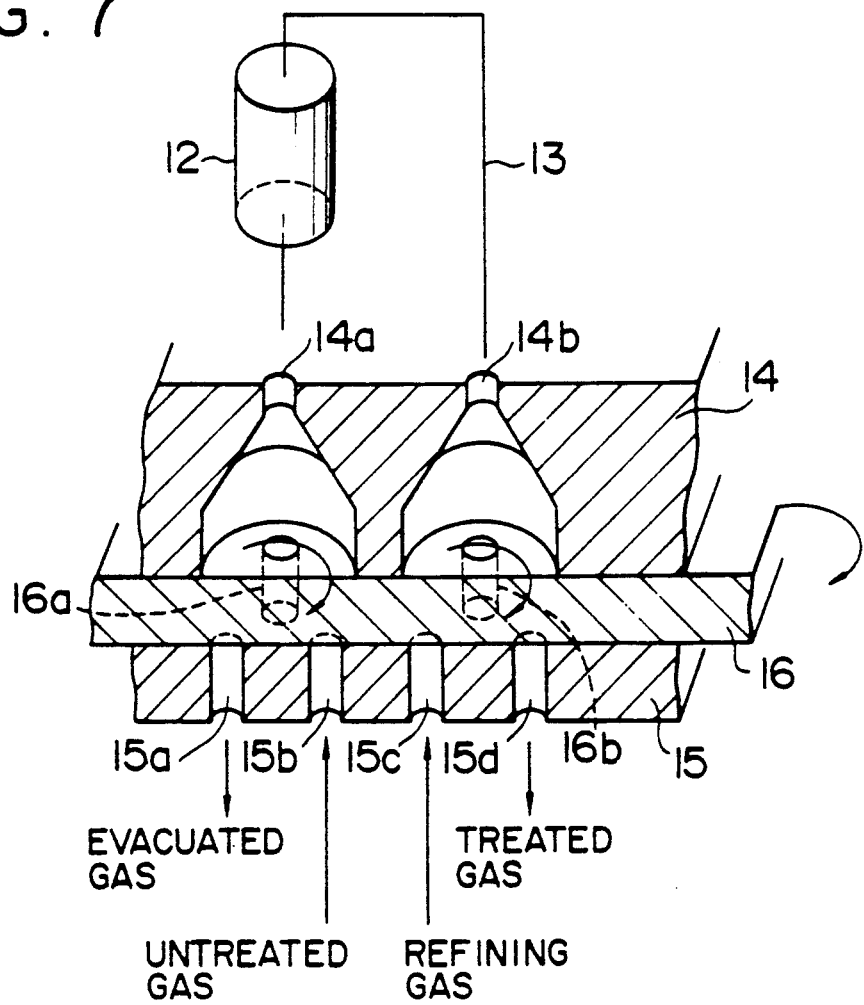
FIG. 7 is a perspective cross sectional view of the main part of the embodiment of FIG. 6.

The openings 14a, 14b of the first manifold in the above-described embodiments have a size which covers the movement range of the openings 16a, 16b of the valve plate as shown in FIGS. 6 and 7. In addition, the openings 14a and 14b may be arranged so that each opening is divided into two whereby each opening is superposed on the openings 15a, 15b and 15c, 15d of the second manifold 15.

Although a plurality of adsorbing portions are provided in the above-described embodiments, this invention can, needless to say, be carried out in a PSA gas separating system having a single adsorbing portion.

Although the discharge of treated gas and the supply of refining gas are performed through the first manifold by one opening in the valve plate and two openings in the second manifold in the above-described embodiments, the discharge of treated gas and the supply of refining gas may be performed without passing through the valve plate and the manifold.

In the invention described with reference to the embodiments shown in FIGS. 6 through 11, the opening connected to the gas source and the opening connected to the vacuum source in the second manifold are sequentially connected to the openings in the first manifold via the openings in the valve plate by the rotating motion of the openings in the valve plate. When the opening in the first manifold is connected to the gas source, the gas is introduced into the adsorbing portion and a particular component in the gas is adsorbed onto the adsorbent. When the opening in the first manifold is connected to the vacuum source, the adsorbing portion is evacuated and the particular component in the gas which has been adsorbed onto the adsorbent is desorbed and discharged from the adsorbing portion. Thus, adsorption by the adsorbent desorption are performed repeatedly by the rotating motion of the valve plate.

Because the valve plate performs an oscillating motion, it is also possible to reduce the sliding speed by decreasing the radius of rotation, resulting in decreased torque required for the movement of the valve plate, hence the driving power.

Since the connection and shutoff of openings in both manifolds are carried out by the oscillating rotating motion of the valve plate, there is a high degree of freedom in the arrangement of openings, whereby the system is made compact.

(3) The inventors have developed a rotary gas recovery system to eliminate the disadvantages of the conventional rotary gas recovery system described with reference to FIGS. 22 through 25. The newly developed rotary gas recovery system comprises a rotary adsorbing/desorbing device which is cylindrical in shape, has a plurality of compartments around the centerline within the system, and rotates around its axis, a seal plate which is installed on one end surface of the adsorbing/desorbing device, has a material gas supply port, and does not rotate around the axis, and a seal plate which is installed on the other end surface of the adsorbing/desorbing device, and does not rotate around the axis. In this rotary gas recovery system, the seal plates can be moved in the axial direction, and a load applying mechanism for pressing the seal plate against the end surface is provided for each seal plate.

In this new and not publicly known rotary gas recovery system, the seal plate is pressed against the end surface of the rotary adsorbing/desorbing device by the load applying mechanism, so that there is no gap between the end surface and the seal plate, whereby the leak of gas is prevented.

This rotary gas recovery system will be described with reference to an embodiment shown in FIGS. 12 through 15.

Figure 12:
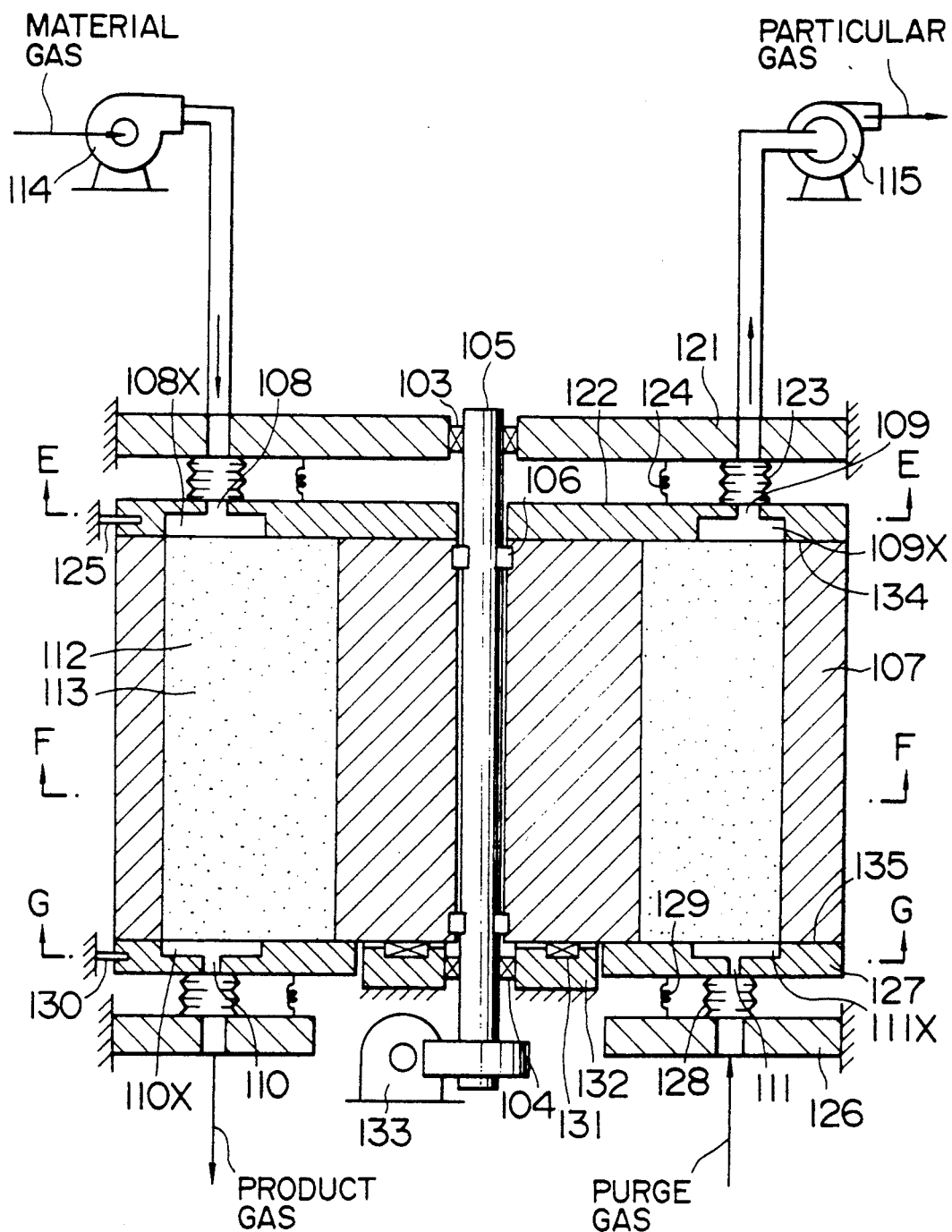
FIG. 12 is a vertical cross sectional view illustrating a further gas recovery system of the invention.
Figure 13:
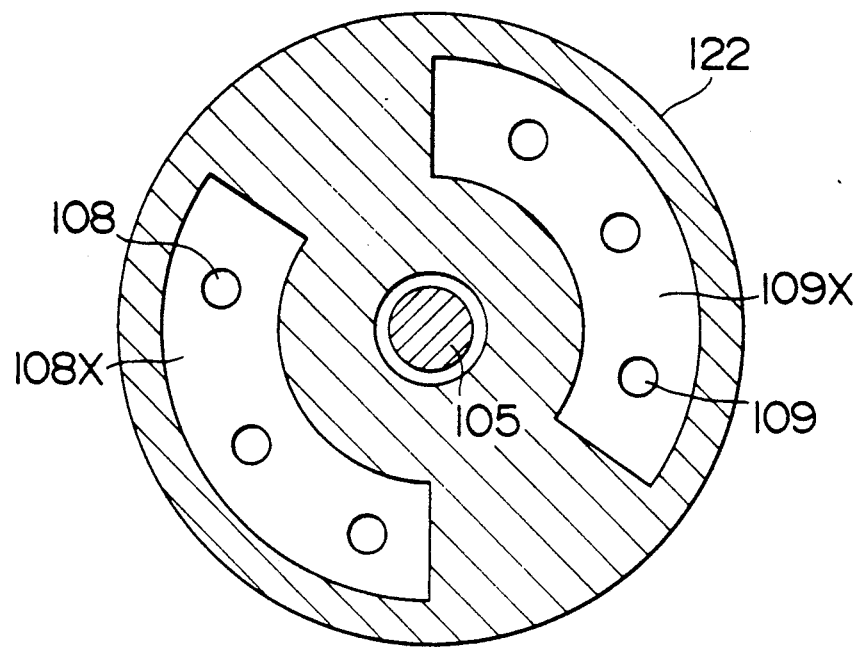
FIG. 13 is a cross sectional view taken along the plane of line E—E of FIG. 12.

In FIG. 12, reference numeral 114 denotes a gas compressor for supplying material gas, 115 denotes a vacuum pump for sucking and discharging the particular gas, 121 denotes an upper fixed manifold which is connected to the compressor 114 and the vacuum pump 115 and in which a material gas manifold and a particular gas manifold are formed at the respective connecting part, 122 denotes a movable seal plate which is disposed under the manifold 121 and can be moved vertically only and whose rotating motion is inhibited, 108 denotes a material gas supply port installed in the movable seal plate 122, 108X denotes a groove connected to the supply port 108, 109 denotes a particular gas discharge port installed in the movable seal plate 122, 109X denotes a groove connected to the discharge port 109, 123 denotes a bellows which connects the material gas manifold of the upper fixed manifold 121 to the material gas supply port 108 or connects the particular gas manifold of the upper fixed manifold 121 to the particular gas discharge port 109, 124 denotes a spring installed between the upper fixed manifold 121 and the movable seal plate 122, and 125 denotes a locking pin for preventing the rotation of the movable seal plate 122.

Reference numeral 126 denotes a lower fixed manifold in which a product gas manifold and a purge gas manifold are formed, 127 denotes a movable seal plate which is disposed over the manifold 126 and can be moved vertically only and whose rotating motion is inhibited, 110 denotes a product gas discharge port installed in the movable seal plate 127, 110X denotes a groove connected to the discharge port 110, 111 denotes a small hole for supplying purge gas which is installed in the movable seal plate 127, 111X denotes a groove connected to the small hole 111, 128 denotes a bellows which connects the product gas manifold of the lower fixed manifold 126 to the product gas discharge port 110 or connects the purge gas manifold of the lower fixed manifold 126 to the small hole for supplying purge gas, 129 denotes a spring installed between the lower fixed manifold 126 and the movable seal plate 127, and 130 denotes a locking pin for preventing the rotation of the movable seal plate 127.

Reference numeral 103 denotes a bearing installed in the upper fixed manifold, 132 denotes a fixed portion under this system, 104 denotes a bearing installed in the fixed portion 132, 131 denotes a thrust bearing installed on the fixed portion 132, 105 denotes a rotating shaft which is mounted by the bearings 103, 104 and rotates, 106 denotes a key installed on the rotating shaft 105, 107 denotes a rotary adsorbing/desorbing device which is fixed to the rotating shaft 105 by the keys 106, and rotates together with the rotating shaft 105, being mounted by the thrust bearing 131 between the upper movable seal plate 122 and the lower movable seal plate 127, and 133 denotes a motor for driving the rotating shaft 105.

Figure 14:
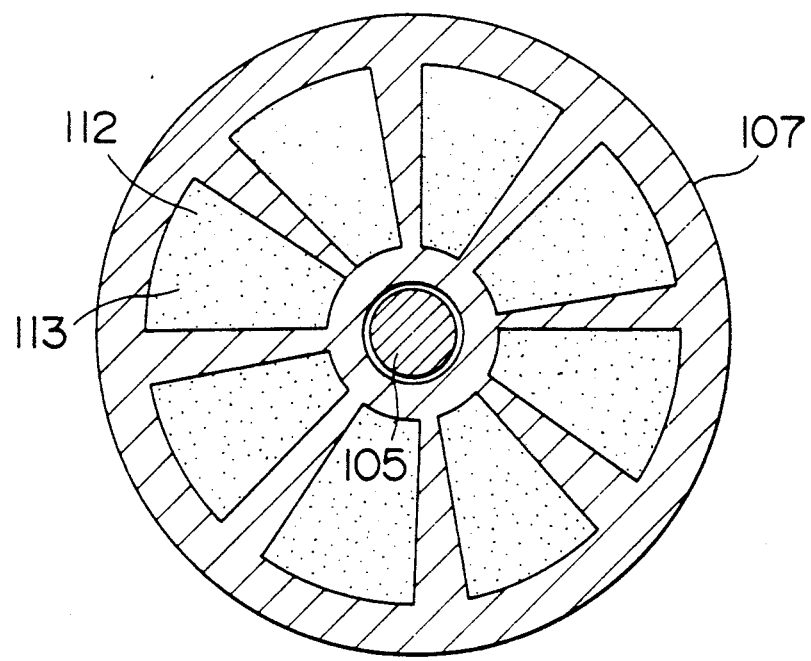
FIG. 14 is a cross sectional view taken along the plane of line F—F of FIG. 12.
Figure 15:
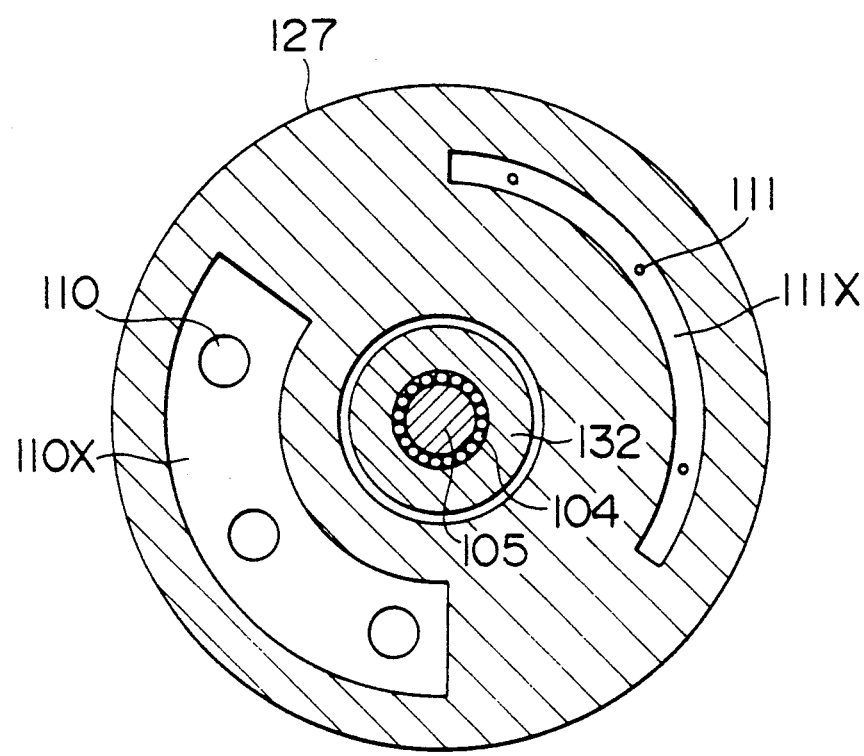
FIG. 15 is a cross sectional view taken along the plane of line G—G of FIG. 12.

The adsorbing/desorbing device 107 has a plurality of compartments 112 (eight compartments in this embodiment) disposed as shown in FIG. 14 (the sectional view taken along the plane of line F—F of FIG. 12), which is filled with adsorbent 113. The upper and lower movable seal plates 122 and 127, which are pressed against the end surface of the adsorbing/desorbing device 107, have grooves 108X, 109X or 110X, 111X which cover a plurality of compartments (three compartments each in this embodiment) positioned symmetrically in relation to the rotating shaft.

In this system, the material gas is supplied to the compartment 112 of the rotary adsorbing/desorbing device 107 connecting to the material gas supply port 108 through the material gas supply port 108 and the groove 108X by the gas compressor 114. In the compartment, a particular gas is adsorbed onto the adsorbent 113 with which the compartment is filled, and the gas which has not been adsorbed, that is to say, the product gas is discharged through the discharge groove 110X and the discharge port 110. When the compartment having the adsorbent onto which the particular gas has been adsorbed comes in communication with the particular gas discharge groove 109X and the discharge port 109, the particular gas is removed from the adsorbent 113 by the evacuating action of the vacuum pump 115 and discharged for recovery. In this process, the purge gas is supplied through the small hole 111 for supplying purge gas and the groove 111X to facilitate the removal of the particular gas. Thus, the above-described system produces the product gas and recovers the particular gas continuously by the rotation of adsorbing/desorbing device 107.

Since the performance of this system is governed by the amount of gas leak from the seal surfaces 134 and 135 (FIG. 12), the gas leak should be minimized. Therefore, the upper and lower movable seal plates 122, 127 are pressed against the end surface of rotary adsorbing/desorbing device 107 by the springs 124, 129, by which the gap of seal surface is reduced while the wear of the seal surface is prevented.

To treat a large amount of gas, for example 50-100 m³/h, the system must be made large. In this case, the size and weight of the adsorbing/desorbing device, of course, must be increased. Since the gas recovery system shown in FIGS. 12 through 15 is of a rotary type, the driving system consisting of a motor, reducer, driving shaft, etc. must be enlarged, which increases not only the manufacturing cost but also the power consumption for operation, hence the running cost.

(4) The invention according to the first and fourth (especially the fourth) aspects provides a gas recovery system in which the adsorbing/desorbing device of heavy weight is of a fixed type, and the driving system is made compact by installing a lightweight rotary valve plate, thereby the running cost being reduced.

An embodiment of this invention according to the first and fourth (especially the fourth) aspects will be described with reference to FIGS. 16 through 20.

Figure 16:
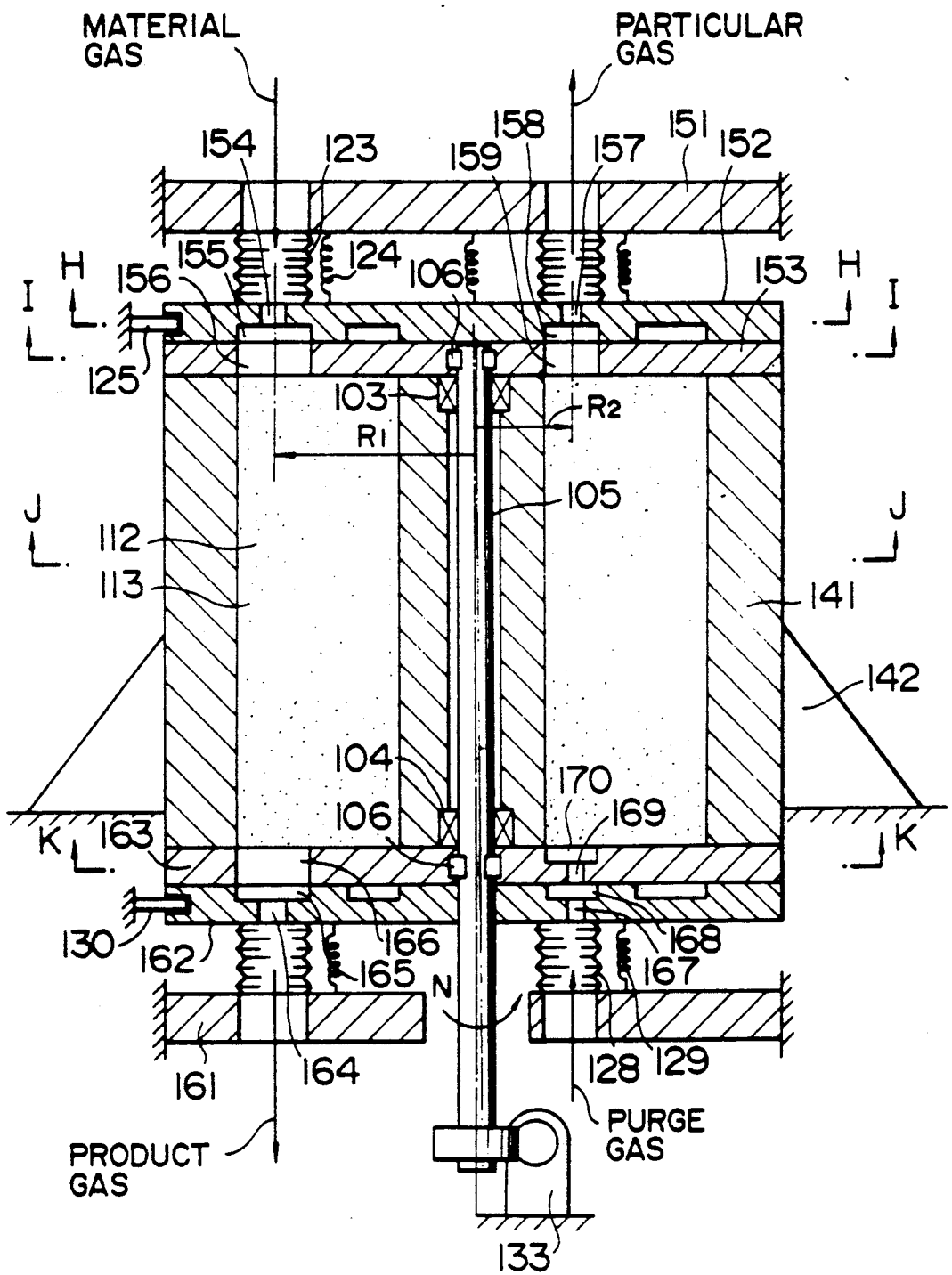
FIG. 16 is a vertical cross sectional view illustrating an embodiment of this invention according to the first and fourth (especially the fourth) aspects.

In FIG. 16, reference numeral 141 denotes a fixed adsorbing/desorbing device of cylindrical shape installed with its centerline being vertical, 142 denotes a fixing leg for securing the adsorbing/desorbing device 141 to a fixed portion. Whereas the adsorbing/desorbing device shown in FIGS. 12 through 15 is of a rotary type, the adsorbing/desorbing device of this embodiment is of a fixed type.

Figure 19:
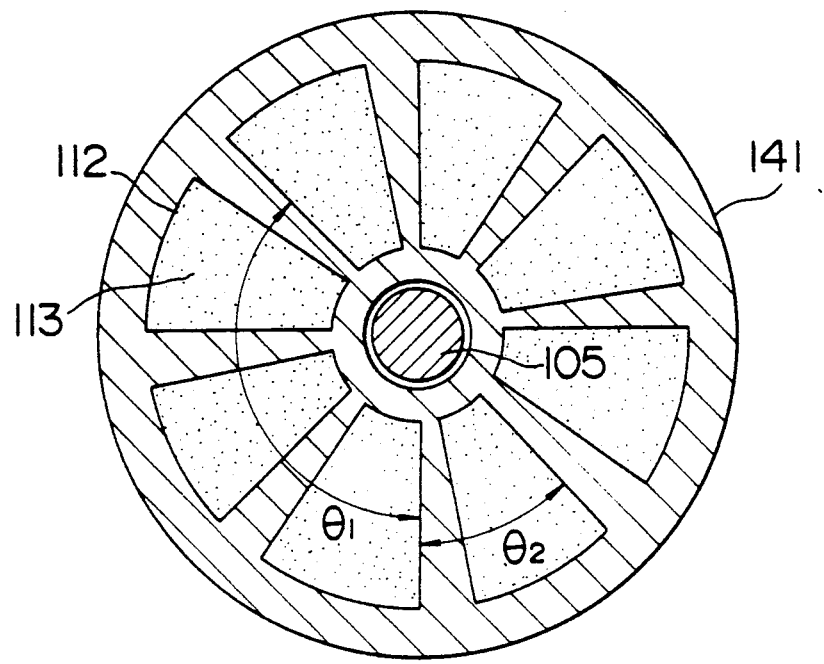
FIG. 19 is a cross sectional view taken along the plane of line J—J of FIG. 16.

The internal construction of the adsorbing/desorbing device is the same as that of the above-described device as shown in FIG. 19 (the sectional view taken along the plane of line J—J of FIG. 16). A plurality of compartments 112 are installed, which is filled with adsorbent. At the center of the adsorbing/desorbing device 141, a rotating shaft 105 is installed via bearings 103, 104. Reference numeral 133 denotes a motor for driving the rotating shaft 105.

Reference numeral 151 denotes an upper fixed manifold, 152 denotes a movable seal plate which is disposed under the manifold 151 and can be moved vertically only and whose rotating motion is inhibited by a locking pin 125, and 153 denotes a rotary valve plate which is interposed between the seal plate 152 and the fixed adsorbing/desorbing device 141, and movable vertically and rotatable. This rotary valve plate is installed to the rotating shaft 105 via keys 106 in such a manner that it can slide in the axial direction. In the upper fixed manifold 151, a material gas manifold and a particular gas manifold are formed. Reference numeral 123 denotes a bellows which connects the manifold of the upper fixed manifold 151 to the vertically movable seal plate 152, and 124 is a spring which is installed between the upper fixed manifold 151 and the movable seal plate 152 and applies a pressure to prevent gas leak from the rotating and sliding surface.

Reference numeral 161 denotes a lower fixed manifold, 162 denotes a movable seal plate which is disposed over the manifold 161 and can be moved vertically only and whose rotating motion is inhibited by a locking pin 130, and 163 denotes a rotary valve plate which is interposed between the seal plate 162 and the fixed adsorbing/desorbing device 141, and movable vertically and rotatable. This rotary valve plate is slidably installed to the rotating shaft 105 via keys 106. In the lower fixed manifold 161, a product gas manifold and particular gas manifold are formed. Reference numeral 128 denotes a bellows which connects the manifold of the lower fixed manifold 161 to the vertically movable seal plate 162, and 129 is a spring which is installed between the lower fixed manifold 161 and the movable seal plate 162 and applies a pressure to prevent gas leak from the rotating and sliding surface.

Figure 17:
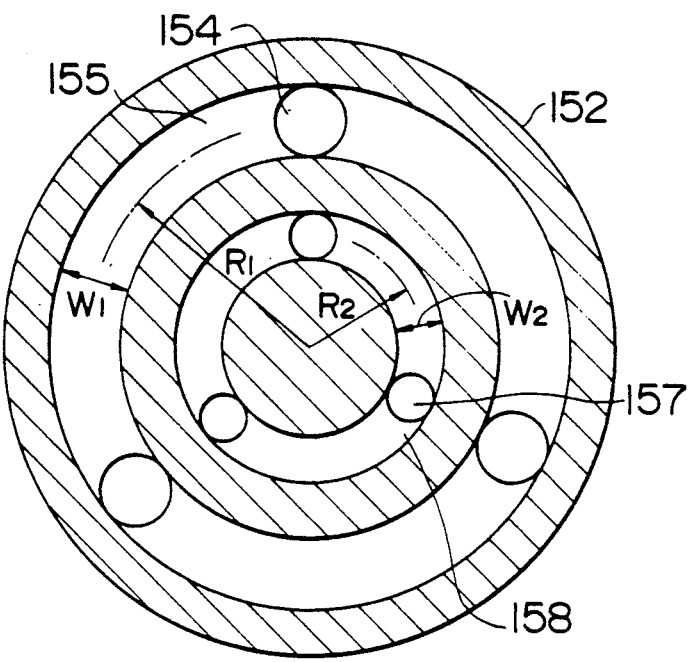
FIG. 17 is a cross sectional view taken along the plane of line H—H of FIG. 16.

FIG. 17 is a sectional view of the upper movable seal plate 152 (the sectional view taken along the plane of line H—H of FIG. 16). In this figure, reference numeral 154 denotes a material gas supply port, 155 denotes a circumferential material gas groove, 157 denotes a particular gas discharge port, and 158 denotes a circumferential particular gas groove. The circumferential material gas groove 155 communicates with the material gas manifold of the upper fixed manifold 151 via the material gas supply port 154 and the bellows 123, and is connected to a gas compressor for supplying material gas as with the case of FIGS. 12 through 15. The circumferential particular gas groove 158 communicates with the particular gas manifold of the upper fixed manifold 151 via the particular gas discharge port 157 and the bellows 123, and is connected a vacuum pump for sucking and discharging particular gas as with the case of FIGS. 12 through 15.

Figure 18:
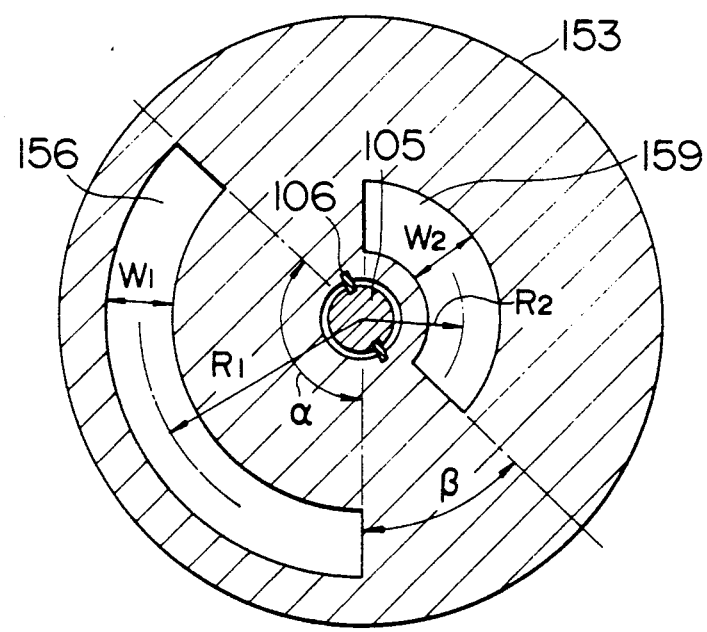
FIG. 18 is a cross sectional view taken along the plane of line I—I of FIG. 16.

FIG. 18 is a sectional view of the upper rotary valve plate 153 (the sectional view taken along the plane of line I—I of FIG. 16). In the figure, reference numeral 156 denotes a material gas opening, and 159 denotes a particular gas opening. The circumferential material gas groove 155 on the movable seal plate 152 and the material gas opening 156 in the rotary valve plate 153 are constructed so as to have the same radius $R_1$ and the same width $W_1$ and overlap with each other. The circumferential particular gas groove 158 on the movable seal plate 152 and the particular gas opening 159 in the rotary valve plate 153 are constructed so as to have the same radius $R_2$ and the same width $W_2$ and overlap with each other. The expanding angles of both the material gas opening 156 and the particular gas opening 159 are $\theta_1$. The expanding angles of both closing portions between the two openings are $\theta_2$. As shown in the figure, the construction is such that the sum of $\theta_1$ and $\theta_2$ is 180 degrees. It can, therefore, be said that the material gas opening 156 and the particular gas opening 159 are located 180 degrees out of phase. The expanding angle $\theta_1$ of the opening is an angle which covers a plurality of compartments 112 of the fixed adsorbing/desorbing device 141. The expanding angle $\theta_2$ of the closing portion is an angle which covers at least one compartment.

In the movable seal plate 162 installed under the adsorbing/desorbing device 141 shown in FIG. 16, reference numeral 164 denotes a product gas discharge port, 165 denotes a circumferential product gas groove, 167 denotes a purge gas supply port, and 168 denotes a circumferential purge gas groove. Although the sectional view of the movable seal plate 162 is omitted, its constitution is the same as shown in FIG. 17. In FIG. 17, the material gas supply port 154 and the circumferential material gas groove 155 can be regarded as the product gas discharge port 164 and the circumferential product gas groove 165, respectively, and the particular gas discharge port 157 and the circumferential particular gas groove 158 can be regarded as the purge gas supply port 167 and the circumferential purge gas groove 168, respectively. The circumferential product gas groove 165 communicates with the product gas manifold of the lower fixed manifold 161 via the product gas discharge port 164 and the bellows 128. The circumferential purge gas groove 168 communicates with the purge gas manifold of the lower fixed manifold 161 via the purge gas supply port 167 and the bellows 128.

Figure 20:
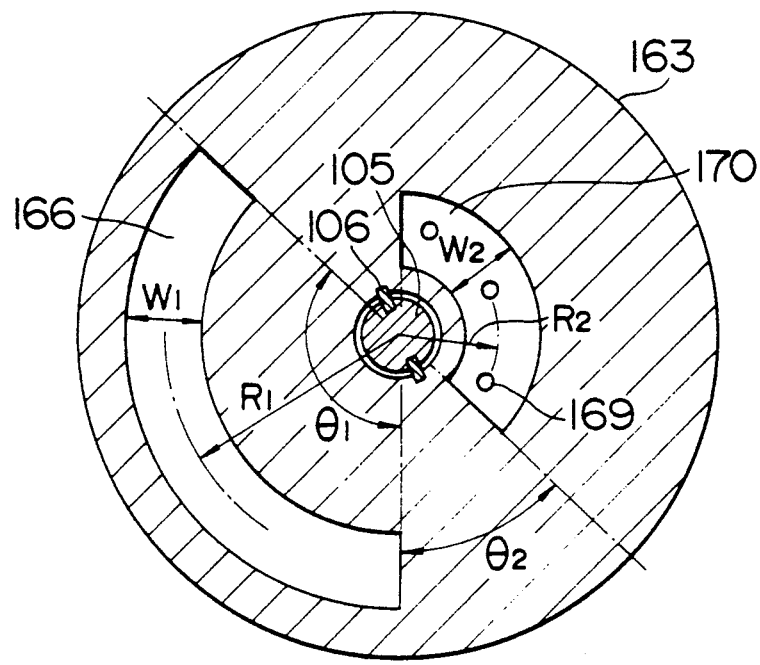
FIG. 20 is a cross sectional view taken along the plane of line K—K of FIG. 16.
Figure 21:
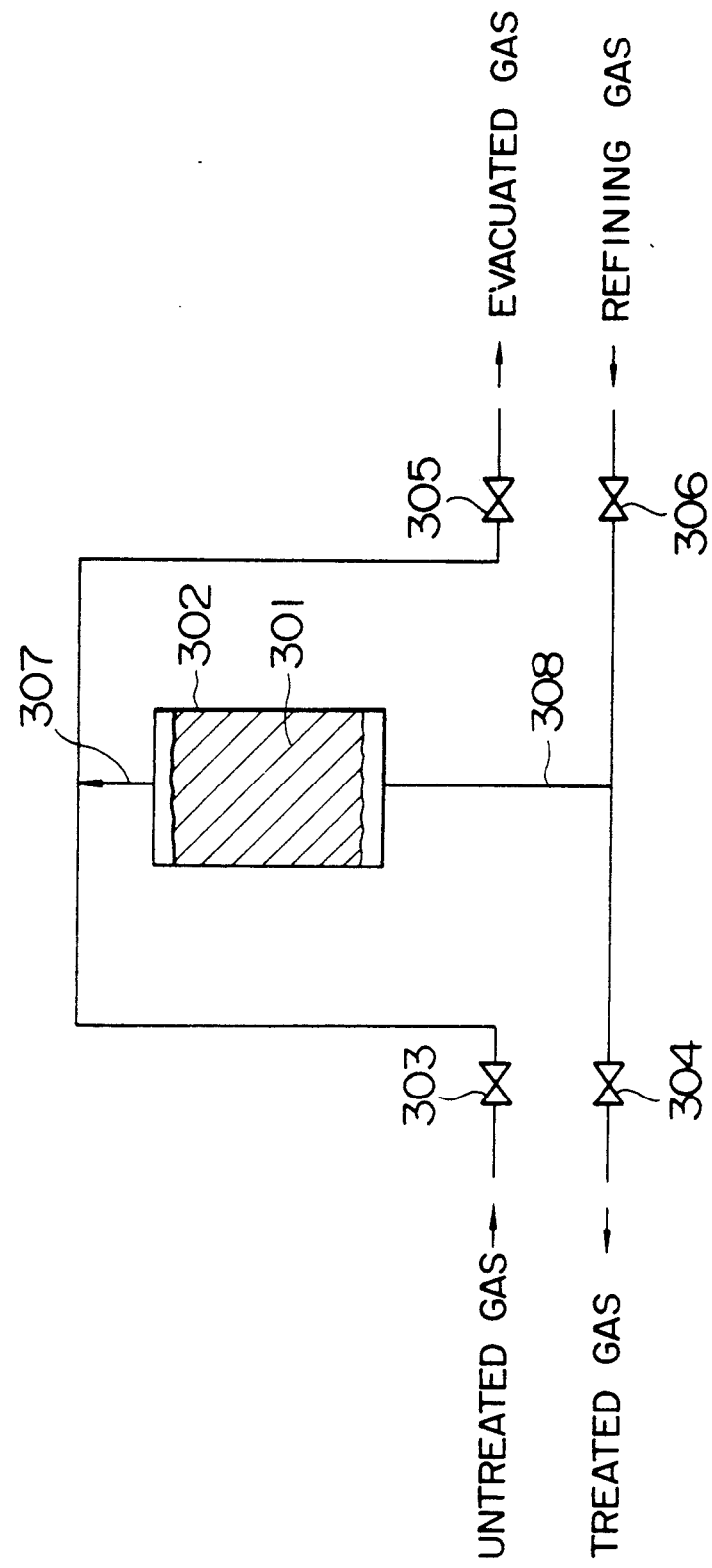
FIG. 21 is a cross sectional view of a conventional PSA system.
Figure 22:
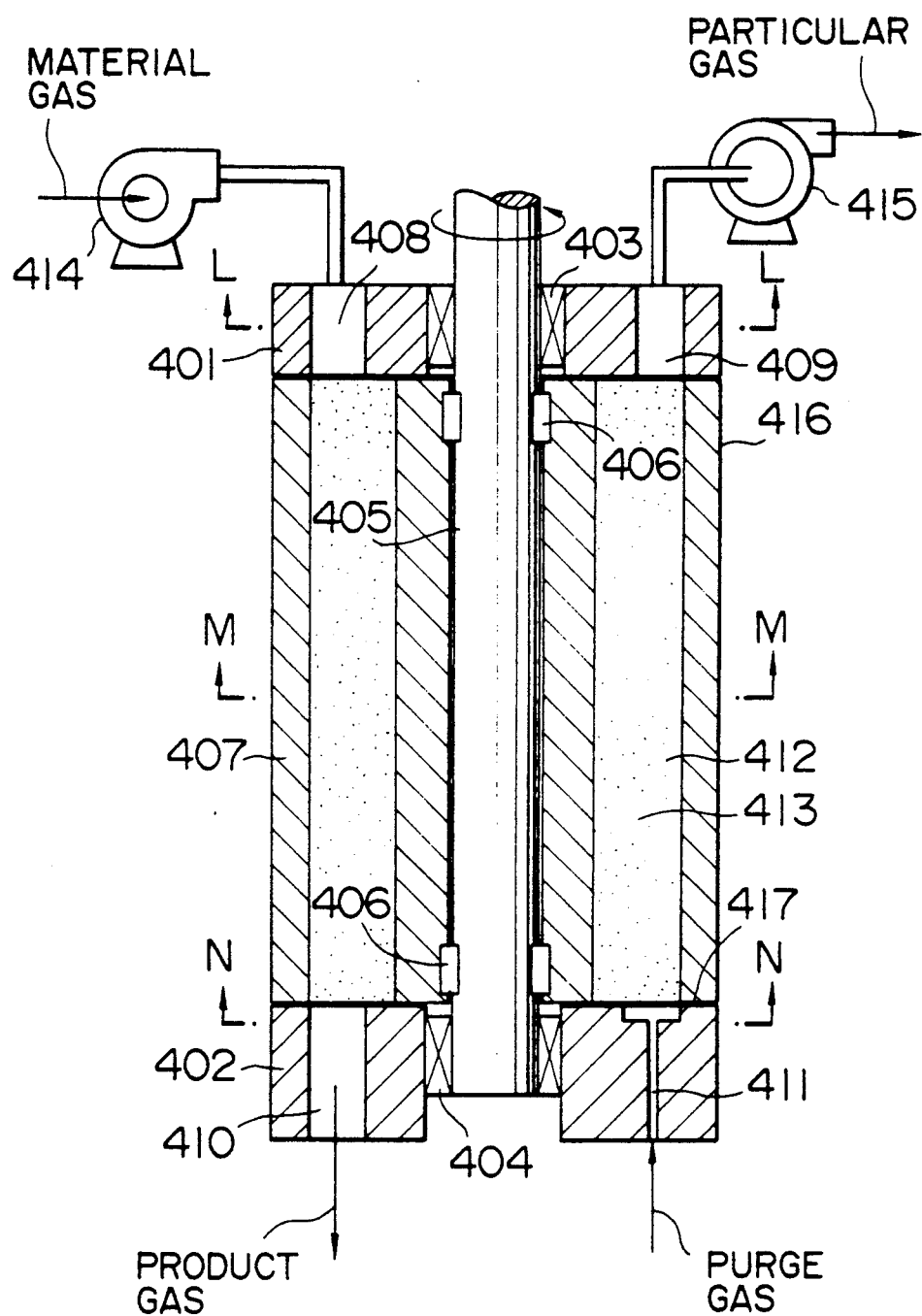
FIG. 22 is a vertical cross sectional view of a conventional rotary gas recovery system.
Figure 23:
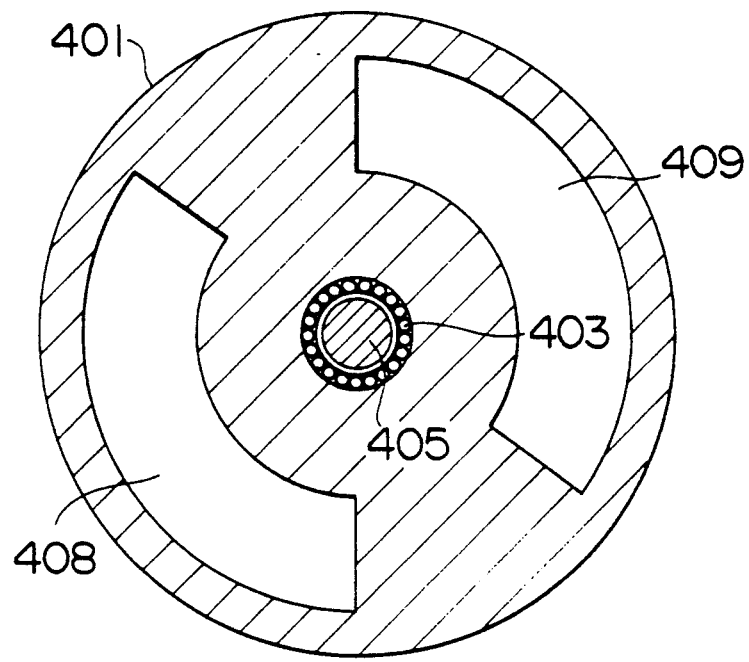
FIG. 23 is a cross sectional view taken along the plane of line L—L of FIG. 22.
Figure 24:
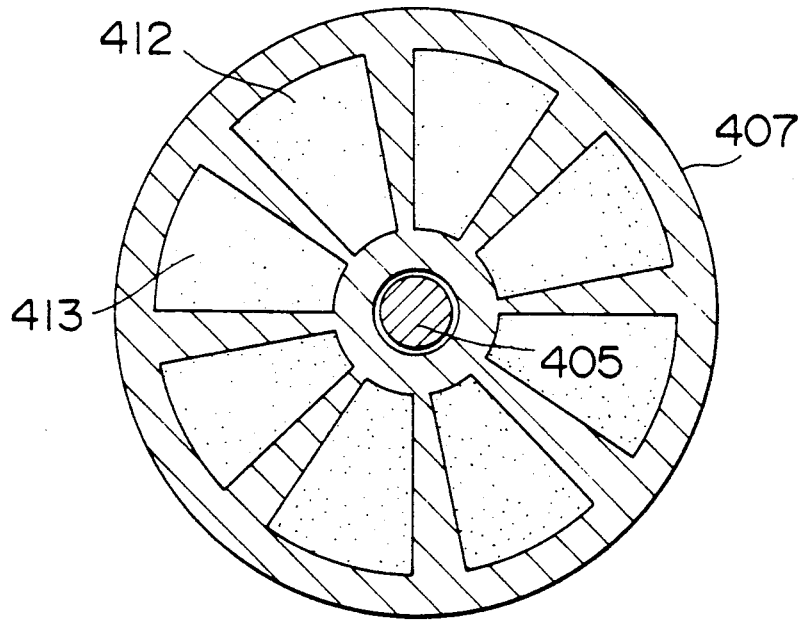
FIG. 24 is a cross sectional view taken along the plane of line M—M of FIG. 22.
Figure 25:
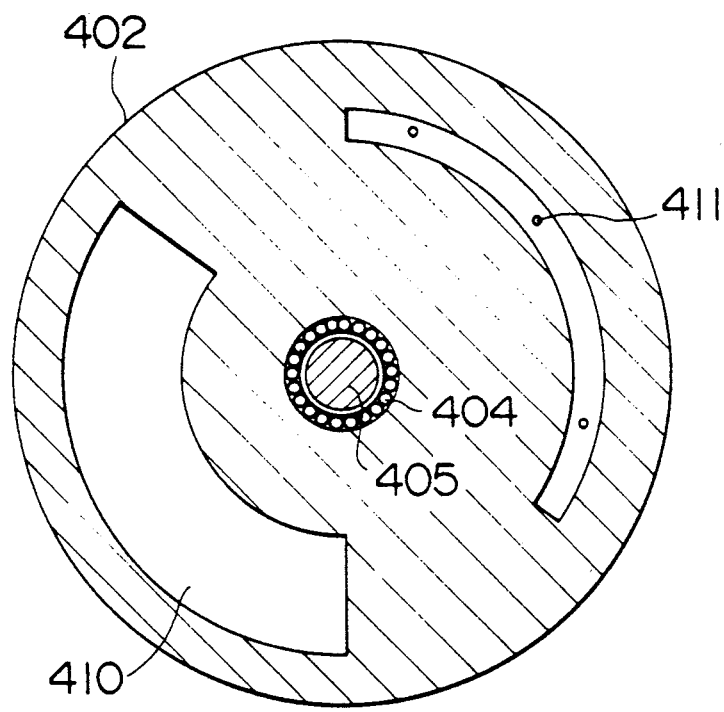
FIG. 25 is a cross sectional view taken along the plane of line N—N of FIG. 22.

FIG. 20 is a sectional view of the lower rotary valve plate 163 (the sectional view taken along the plane of line K—K of FIG. 16). In the figure, reference numeral 166 denotes a product gas opening, 169 denotes a small hole for supplying purge gas, and 170 denotes a purge gas groove. This sectional view has a shape, dimensions and angles corresponding to the sectional view of the upper rotary valve plate 153 shown in FIG. 18, but the lower rotary valve plate 163 differs from upper rotary valve plate 153 in that the portion for the purge gas consists of the small holes 169 for supplying purge gas and the purge gas groove 170.

In the above-described system, the material gas is supplied to the compartment 112 of the fixed adsorbing-/desorbing device 141 through the material gas supply port 154, the circumferential material gas groove 155, and the material gas opening 156 by a gas compressor. In the compartment, a particular gas is adsorbed onto the adsorbent 113 with which the compartment is filled. The gas which has not been adsorbed, that is to say, the product gas is discharged through the product gas opening 166, the circumferential product gas groove 165, and the product gas discharge port 164. The adsorbing/desorbing device 141 is fixed in this system. When the rotating shaft 105 is driven by the motor 133, the upper and lower rotary valve plates 153, 163 which are connected to the rotating shaft by the keys 106 rotate at the same speed. When the rotary valve plates rotate 180 degrees, the particular gas opening 159 and the purge gas groove 170 comes over and under the compartment in which the particular gas has been adsorbed, respectively. At this time, the particular gas is removed from the adsorbent by the evacuating action of vacuum pump, and discharged through the particular gas opening 159, the circumferential particular gas groove 158, and the particular gas discharge port 157 for recovery. In this process, the purge gas is supplied through the purge gas supply port 167, the circumferential purge gas groove 168, the small hole 169 for supplying purge gas, and the purge gas groove 170 to facilitate the removal of the particular gas. Since the above-described process is performed sequentially in the compartments of the fixed adsorbing/desorbing device by the rotation of the rotary valve plate, the product gas is produced and the particular gas is recovered continuously. Although there are rotating and sliding surfaces between the movable seal plate 152, the rotary valve plate 153, the fixed adsorbing/desorbing device 141, the rotary valve plate 163, and the movable seal plate 162, gas leak is prevented because the springs 124, 129 press the movable seal plates 152, 162 and the rotary valve plates 153, 163 against the adsorbing/desorbing device 141 from the manifold side.

As described with reference to FIGS. 16 through 20, in the gas recovery system according to the fourth aspect, the circumferential material gas groove and the circumferential particular gas groove on the first seal plate are installed concentrically. The material gas opening and the particular gas opening in the first rotary valve plate are installed so as to have the same radius with that of the corresponding grooves and to be superposed on the grooves. By the rotation of the rotary valve plates, therefore, the material gas fed from the circumferential material gas groove is sequentially supplied to a plurality of compartments of the fixed adsorbing/desorbing device, and the particular gas is sequentially sucked from the compartments by the suction from the circumferential particular gas groove. This relationship holds between the second rotary valve plate and the second seal plate.

As described above, in the embodiment of this invention shown in FIGS. 16 through 20, the adsorbing-/desorbing device which has higher capacity and larger size is not rotated but is fixed, and lightweight rotary valve plates are newly installed for continuous treatment, by which this system offers advantages of compact driving system, reduced running cost (especially power consumption) in gas recovery, and elimination of needs for thrust bearing which rotatably supports the adsorbing/desorbing device as shown in FIGS. 12 through 15.

What is claimed is:

1. A pressure swing type gas separating system having adsorbing portions, absorbent in said adsorbing portions, and a selector valve connecting said adsorbing portions to a gas supply source and a vacuum source, said selector valve comprising:
   a first manifold having openings connected to said adsorbing portions;
   a second manifold in spaced relationship to said first manifold to provide a space therebetween and having a first set of openings connected to a gas supply source and a second set of openings connected to a vacuum source;
   a valve plate interposed slidably in said space between said first manifold and said second manifold;
   openings in said valve plate connected to said openings in said first manifold and connectable with said openings in said second manifold; and
   means for oscillating said valve plate so that said openings in said valve plate rotate in the same direction with an equal radius of rotation around a plurality of parallel axes of rotation extending perpendicular to said valve plate for sequentially connecting said openings in said valve plate to an opening in said second manifold communicating with said gas supply source and an opening in said second manifold communicating with said vacuum source.

2. The gas separating system as claimed in claim 1 wherein said means for oscillating said valve plate comprise:
   at least one rotatably driven drive shaft having an axis of rotation extending perpendicular to said valve plate; and
   a first eccentric disc connected to said at least one drive shaft for rotation therewith and connected to said valve plate at a radius eccentric to said drive shaft so that rotation of said first eccentric disc moves said valve plate in an oscillating manner.

3. The gas separating system as claimed in claim 2 and further comprising:
   a further drive shaft in parallel spaced relation to and rotatably driven in the same direction as said at least one drive shaft; and
   a second eccentric disc connected to said further drive shaft for rotation therewith and eccentrically connected to said valve plate at an eccentric radius equal to the eccentric radius of said first eccentric disc.

4. The gas separating system as claimed in claim 3 wherein:
   said openings in said second manifold are arranged in a plurality of groups disposed outwardly from a central point in said second manifold;

one of said openings in each group is connected to said gas supply source; and one of said openings in each group is connected to said vacuum source.

5. The gas separating system as claimed in claim 4 and further comprising:

a third set of openings in said second manifold connected to a refining gas source;

a fourth set of openings in said second manifold connected to a treated gas outlet;

one of said openings in each group is connected to said refining gas source; and one of said openings in each group is connected to said treated gas outlet, so that oscillation of said valve plate sequentially connects an opening in said valve plate to an opening in said second manifold communicating with said refining gas source and an opening in said second manifold communicating with said treated gas outlet facilitating treatment of gas from said gas supply source in one adsorbing portion simultaneously with treatment of another of said adsorbing portions with gas from said refining gas source.

6. The gas separating system as claimed in claim 2 wherein:

said openings in said second manifold are arranged in a plurality of groups disposed outwardly from a central point in said second manifold;

one of said openings in each group is connected to said gas supply source; and one of said openings in each group is connected to said vacuum source.

7. The gas separating system as claimed in claim 1 wherein:

said openings in said second manifold are arranged in a plurality of groups disposed outwardly from a central point in said second manifold;

one of said openings in each group is connected to said gas supply source; and one of said openings in each group is connected to said vacuum source.

8. The gas separating system as claimed in claim 7 and further comprising:

a third set of openings in said second manifold connected to a refining gas source;

a fourth set of openings in said second manifold connected to a treated gas outlet;

one of said openings in each group is connected to said refining gas source; and one of said openings in each group is connected to said treated gas outlet, so that oscillation of said valve plate sequentially connects an opening in said valve plate to an opening in said second manifold communicating with said refining gas source and an opening in said second manifold communicating with said treated gas outlet facilitating treatment of gas from said gas supply source in one adsorbing portion simultaneously with treatment of another of said adsorbing portions with gas from said refining gas source.

* * * * *